(12) United States Patent
Büchel et al.

(10) Patent No.: US 9,327,551 B2
(45) Date of Patent: May 3, 2016

(54) VEHICLE WHEEL FOR UTILITY VEHICLES

(75) Inventors: Hans-Heiner Büchel, Königswinter (DE); Jörg Schumacher, Wegberg (DE)

(73) Assignee: KRONPRINZ GMBH, Solingen (DE)

( * ) Notice: Subject to any disclaimer, the term of this patent is extended or adjusted under 35 U.S.C. 154(b) by 380 days.

(21) Appl. No.: 13/997,061

(22) PCT Filed: Dec. 12, 2011

(86) PCT No.: PCT/DE2011/002164
§ 371 (c)(1),
(2), (4) Date: Sep. 12, 2013

(87) PCT Pub. No.: WO2012/095079
PCT Pub. Date: Jul. 19, 2012

(65) Prior Publication Data
US 2014/0300176 A1    Oct. 9, 2014

(30) Foreign Application Priority Data

Dec. 23, 2010  (DE) .......................... 10 2010 056 419
Jun. 22, 2011  (DE) ...................... 20 2011 102 515 U

(51) Int. Cl.
*B60B 21/02*    (2006.01)
*B60B 3/04*     (2006.01)

(52) U.S. Cl.
CPC ............. *B60B 21/026* (2013.01); *B60B 21/023* (2013.01); *B60B 21/028* (2013.01); *B60B 3/044* (2013.01); *B60Y 2200/11* (2013.01); *B60Y 2200/14* (2013.01)

(58) Field of Classification Search
CPC .... B60B 21/02; B60B 21/023; B60B 21/026; B60B 21/028; B60B 21/10; B60B 21/102; B60B 21/108
See application file for complete search history.

(56) References Cited

U.S. PATENT DOCUMENTS 5,788,334 A * 8/1998 Renard .................. B60B 3/005
                                                        301/5.24
6,450,226 B2    9/2002 DeLacroix et al.
(Continued)

FOREIGN PATENT DOCUMENTS

CN    201544706    8/2010
EP    0 701 911    3/1996
(Continued)

OTHER PUBLICATIONS

International Search Report issued by the European Patent Office in International Application PCT/DE2011/002164 on May 23, 2012.

*Primary Examiner* — John Walters
*Assistant Examiner* — James Triggs
(74) *Attorney, Agent, or Firm* — Henry M. Feiereisen LLC

(57) ABSTRACT

The invention relates to a vehicle wheel for commercial vehicles, comprising a 15° tapered rim for tubeless tires and a wheel disk connected to the tapered rim, wherein the tapered rim has a rim drop center, an outer rim shoulder, and a cylindrical transition part (ledge) which is arranged between the rim drop center and the outer rim shoulder, and wherein, between the cylindrical transition portion and the outer rim shoulder, a rim section having a transition bevel (transition segment) is located, in which a valve port for receiving the valve is provided. According to the invention, the transition bevel which is formed between the cylindrical transition portion and the outer rim shoulder is subdivided into more than one section, wherein the transition bevel or the transition segment transitions directly, without hump, into the outer rim shoulder, and the valve port is arranged in one of the sections of the transition bevel or of the transition segment.

13 Claims, 3 Drawing Sheets

(56) References Cited

U.S. PATENT DOCUMENTS 8,382,212 B2 * 2/2013 De Souza Manso .... B60B 3/044
 301/63.101
8,783,788 B2 * 7/2014 Fleck ........................ B60B 7/12
 301/37.102

FOREIGN PATENT DOCUMENTS

| EP | 1 106 388 | 6/2001 |
|----|-----------|---------|
| EP | 2 036 742 | 3/2009 |
| EP | 2 374 631 | 10/2011 |

* cited by examiner

VEHICLE WHEEL FOR UTILITY VEHICLES

CROSS-REFERENCES TO RELATED APPLICATIONS

This application is the U.S. National Stage of International Application No. PCT/DE2011/002164, filed Dec. 12, 2011, which designated the United States and has been published as International Publication No. WO 2012/095079 and which claims the priorities of German Patent Applications, Serial No. 10 2010 056 419.2, filed Dec. 23, 2010, and 20 2011 102 515.6, filed Jun. 22, 2011, pursuant to 35 U.S.C. 119(a)-(d).

BACKGROUND OF THE INVENTION

The invention relates to a vehicle wheel for utility vehicles, with 15° tapered rim for tubeless tires and a wheel disk connected with the tapered rim, wherein the tapered rim has a rim drop center, an outer rim shoulder, a cylindrical transition part (ledge) which is arranged between the rim drop center and the outer rim shoulder, and wherein, between the cylindrical transition part and the outer rim shoulder, a rim section with a transition bevel is located in which a valve port for receiving a valve is provided.

Utility vehicles relate in this invention to vehicles used for transportation of heavy loads or passengers, and provided with a tapered rim. Examples include in addition to trucks also trailers (trailers or semi-trailers) or buses.

Vehicle wheels constructed this way and having a valve on the outside, i.e. with a valve shaft which for inflating the tire with air is not guided through the ventilation bore of the disk, are shortly identified as ALV-wheels.

Truck wheels with external valve are known for example from EP 0701911 B1 or EP 1106388 B1, wherein a hump is provided according to EP 0701911. A hump is a bulge extending on and around the vehicle shoulder so as to be able to prevent movement of the tires in direction of the drop center, when the tire loses air. In ALV-wheels in accordance with the afore-mentioned patent, the hump serves essentially for creating the required space for receiving the valve in radial direction.

In recent years, ALV-wheels encounter in the field phenomena which imply increasing stress on the rim, in particular in the transition zone between hump and ledge.

The construction in accordance with EP 1106388 B1 does not have a hump, but a so-called safety region, i.e. an essentially cylindrical section (mini ledge) between the outer rim shoulder and a transition bevel to the cylindrical transition part (ledge).

EP 2036742 A1 shows a hump-free ALV construction. The rim includes hereby however exclusively (starting from the front side) of the following elements: bead, front or outer rim shoulder, ledge, drop center, rear rim shoulder, bead. The valve can be inserted in the region between center of the tire seat up to the starting radius of the rim drop center. For that purpose, the valve seat is locally impressed in the rim geometry.

This construction has, however, disadvantages, that is:
As a result the impression, the adjacent tire seat and ledge regions can be partially deformed;
The tire base can be damaged by the exposed valve;
The diameters for ledge and drop center are of relatively great size because of the absence of the transition element, resulting in added weight of rim and disk.

Truck disk wheels are subject to a trend for increasingly greater load-carrying capacity with simultaneously improved wheel service life and reduced weight.

SUMMARY OF THE INVENTION

It is therefore the object of the invention to obviate these drawbacks and to change the rim contour while maintaining the external valve position. Furthermore, the possibility for further reduction of the wheel weight or an increase of the load-carrying capacity should also be taken into consideration.

This object is attained in accordance with the invention with a vehicle wheel for utility vehicles, having a 15° tapered rim for tubeless tires and a wheel disk connected with the tapered rim, wherein the tapered rim has a rim drop center, an outer rim shoulder, a cylindrical transition part (ledge), which is arranged between the rim drop center and the outer rim shoulder, and wherein, between the cylindrical transition part and the outer rim shoulder, a rim section with a transition bevel is located, in which a valve port for receiving a valve is provided, wherein the transition bevel formed between the cylindrical transition part and the outer rim shoulder is subdivided into more than one section, wherein the transition bevel or the transition segment transitions without hump directly into the outer rim shoulder, and the valve port is arranged in one of the sections of the transition bevel or the transition segment.

In accordance with a preferable configuration, the transition bevel without hump transitions into the outer rim shoulder via two juxtaposed, counter-running radii which are tangentially connected with one another, with the valve port being arranged in one of the sections of the transition bevel.

The invention is applicable to all wheels of utility vehicles with 15° tapered rim and drop center rim.

The invention improves wheel service life, overcomes the problem of intense stress in the hump region, and simultaneously affords new potentials for a further weight reduction.

It is essential that one or more curve turning points lie between the outer rim shoulder and the cylindrical transition part in the transition bevel, and that the valve port is arranged in the region of these curve turning points or tangential connection of the transition radii.

The advantages of the solution in accordance with the invention, in which no hump is thus provided, can be summarized as follows:
the hump region is very stiff in view of its geometrical shape and thereby can negatively affect wheel service life as a result of the local stress concentration. The invention renders this region non-critical in terms of stress;
the space requirement of the hump in axial direction necessitates the disk height to be constructed relatively high, which, based on many years of experience, has a negative effect on the total component strength and also increases the wheel weight. The invention enables a significant reduction of the disk height to thereby positively affect service life.
the space requirement of the hump in axial direction and the ETRTO guidelines for designing the drop center leave only a narrow limited space for the disk attachment on the ledge. These limited space conditions in the ledge are not ideal for the disk attachment, in particular with rim widths of less than 9". The invention enables a prolongation of the load-carrying region of the wheel disk, thereby enabling, as experience has shown, an improvement of service life, when the wheels are exposed to great stress.

the space requirement of the hump in axial direction and also the required installation spaces for the disk carrying region and the welding seam between the wheel disk and the wheel rim leaves only a limited installation space for designing the front drop center radius. The invention enables use of the gained space for softer construction of the front drop center radius, which also has a positive effect on the service life. Also, the drop center contour can be widened, leading to a further weight reduction.

The invention is characterized by the following geometry:

The wheel rim is comprised, starting from the front side, of following rotation-symmetrical elements: bead, front rim shoulder, transition bevel to ledge for installation of the valve, ledge, drop center, rear rim shoulder, bead. The transition bevel can be composed of 2 radii transitioning into one another or of 2 tangentially connected radii, or of a multiple of these.

As the hump is eliminated and thereby the omitted local reinforcement with accompanying stress concentration, the wheel service life is improved in the region of the valve and the attachment region between disk and rim.

Instead of the bevel which starts in the upper hump radius in the standard ALV wheel, the transition zone between the front rim shoulder and ledge serves in accordance with the invention for optimal placement of the valve and ensures that as a result of impressing the valve port plane the adjacent regions (rim shoulder+ledge) are not excessively squeezed and thus no tire seat or leakage problems as well as damages to the tire base are encountered.

Various solutions are conceivable for the bevel of the transition zone. 45° is ideal, since the use of existing 45° valves can be continued and the space requirement in axial direction is slight. Solutions with other angles of the transition bevel of greater than 15° (cf. dimensioning of the angle of the valve port bevel in ETRTO) are also conceivable; e.g. a solution with 30° would lead to a softer and thereby better design of the transition radii for the rim in terms of stress.

Furthermore, the radially protected position of the valve ensure easy tire fitting and tire removal without risking damage to the tire base are damaged by a projecting valve.

The elimination of the hump leads also to a substantially improved manual tire removal, as there is no longer a need to press the tire base in pressureless state over the hump.

By eliminating the hump, the wheel disk can be connected significantly further to the front in the rim so that the axial length of the wheel disk (disk height) can be reduced, thereby positively affecting the wheel service life. Furthermore, the reduced disk height decreases the disk weight.

Also the space gained in the axial direction enables an increase of the pressing area between disk edge and rim (increase of the disk panel length), when the wheels are exposed to great stress, thereby positively affecting the wheel service life. Depending on the construction, the gained space can also be used for widening the drop center, which also leads to a weight reduction of the wheel.

The core of the invention is characterized by the following geometry. The rim is comprised, beginning from the front side or outer side (disk attachment side) of the following elements: bead, front or outer rim shoulder, transition bevel/ transition path to the ledge for installation of the valve, ledge, drop center, rear or inner rim shoulder, bead.

As a result of the elimination of the hump and thereby elimination of the local reinforcement with accompanying stress concentration, the wheel service life is significantly improved in the region of the valve and its adjacent radii as well as in the attachment region between disk and the rim.

Instead of the hump, the transition zone between the front rim shoulder and the ledge serves for optimal placement of the valve.

The bevel of the circumferential connection element between rim shoulder and ledge can, optionally, be designed with different angles >15° or designed in radii transitioning into one another, for reducing stress in the transition zones. The gained space as a result of the elimination of the hump provides new design options.

BRIEF DESCRIPTION OF THE DRAWING

The invention will now be described with reference to the drawings.

It is shown in.

DETAILED DESCRIPTION OF PREFERRED EMBODIMENTS

Figure 1:
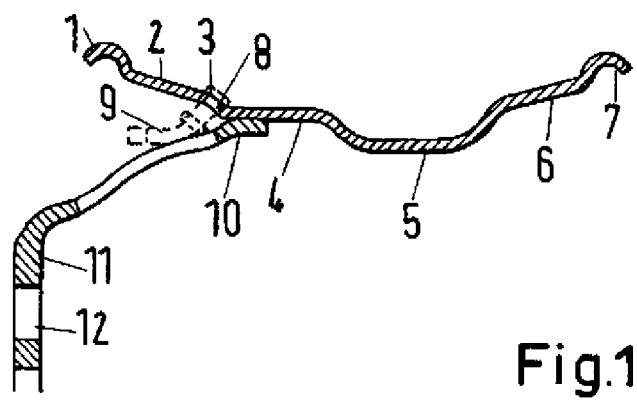
FIG. 1 schematically a wheel rim in accordance with the invention.

In particular, the rim sections are identified from the wheel outer side to the wheel inner side as follows:

1 outer bead, 2 outer rim shoulder, 3 transition bevel, 4 cylindrical transition part (ledge), 5 drop center, 6 inner rim shoulder, and 7 inner bead. 8 designates the valve port with the indicated valve 9.

The edge 10 of the wheel disk 11, from which only the region to the pin hole 12 is shown, is welded to the cylindrical transition part 4.

The configuration of the transition bevel 3 at an angle of 45° is shown in FIG. 1, with the transition bevel transitioning directly, i.e. without hump, into the outer rim shoulder.

Figure 2:
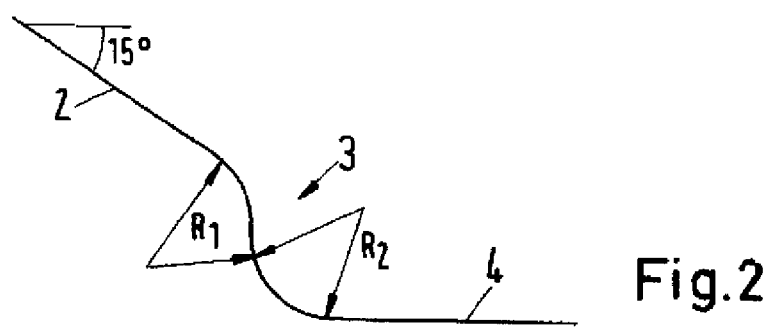
FIGS. 2-7 various embodiments of the transition bevel (transition segment).

The following should be noted with respect to the various embodiments:

In FIG. 2, the transition bevel is subdivided into two sections by two radii which form a turning point.

Figure 3:
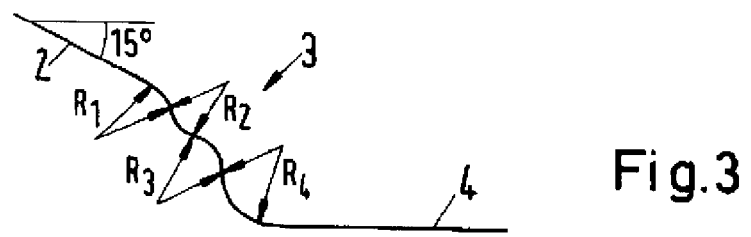

In the embodiment shown in FIG. 3, two further radii are added, wherein it can also be seen that the radius 1 transitions directly into the outer rim shoulder 2, i.e. in the absence of a hump.

Figure 4:
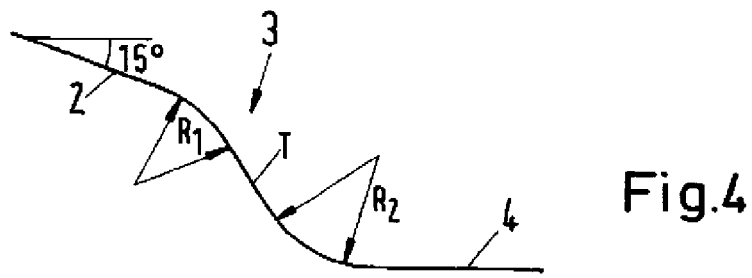
Figure 5:
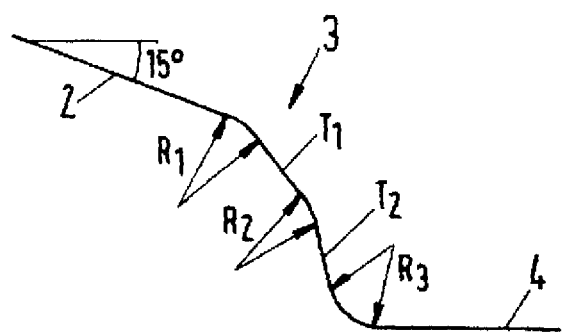
Figure 6:
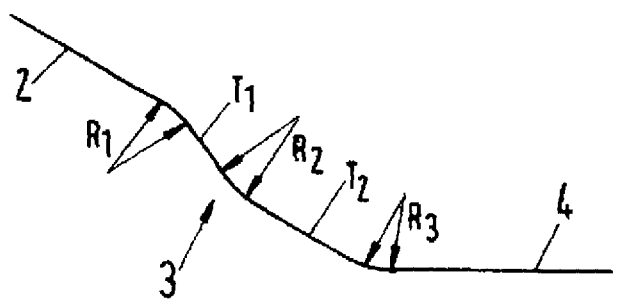

In the third embodiment according to FIG. 4, two radii are connected by a tangent. FIGS. 5 and 6 show that a comparable configuration is also possible with three radii, which are connected by tangents.

Figure 7:
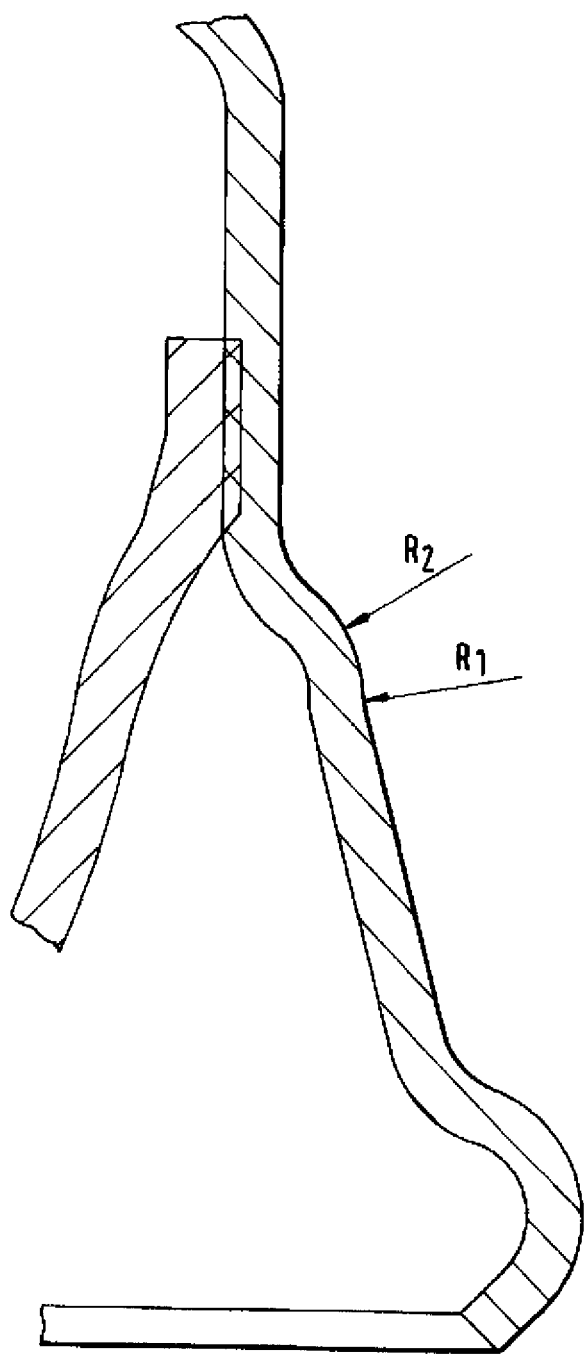

FIG. 7 shows a particular configuration of the connection of the transition bevel with the rim shoulder by two juxtaposed, counter-running radii which are connected tangentially with one another and transition into the outer rim shoulder, and the valve port is arranged in one of the sections of the transition bevel. As a result of the connection element of the two counter-running radii between transition bevel and rim shoulder, additional space is created for the valve to ensure protection of the valve from the tires during the tire fitting/ removal and damages to the tire base can be excluded.

What is claimed is:

1. A vehicle wheel for a utility vehicle, comprising:
a 15° tapered rim for tubeless tires, said tapered rim having a drop center, an outer rim shoulder, and a cylindrical transition part arranged between the drop center and the outer rim shoulder; and
a wheel disc connected with the tapered rim, said tapered rim including a rim section arranged between the cylindrical transition part and the outer rim shoulder and having a transition zone in which a valve port is provided for receiving a valve, said transition zone being subdivided into at least three sections defining two outer sections and at least one intermediate section which connects the outer sections with one another, said transition zone directly transitioning without a hump into the outer rim shoulder, with the valve port arranged in one of the sections of the transition zone.

2. The vehicle wheel of claim 1, wherein the transition zone of the rim section is a transition bevel or a transition segment.

3. The vehicle wheel of claim 1, wherein the cylindrical transition part is constructed as a ledge.

4. The vehicle wheel of claim 1, wherein the transition zone transitions into the outer rim shoulder via two juxtaposed, counter-running radii which are tangentially connected with one another.

5. The vehicle wheel of claim 1, wherein the transition zone has a single curve turning point between the outer rim shoulder and the cylindrical transition portion, said valve port being arranged in a region of the curve turning point.

6. The vehicle wheel of claim 1, wherein the transition zone is comprised of two radii which transition into one another.

7. The vehicle wheel of claim 1, wherein the transition zone is comprised of several radii which transition into one another.

8. The vehicle wheel of claim 1, wherein the transition zone is comprised of two radii which are connected by a tangent.

9. The vehicle wheel of claim 1, wherein the transition zone is comprised of several regions with tangentially connected radii.

10. The vehicle wheel of claim 1, wherein the transition zone has an angle of >15°.

11. The vehicle wheel of claim 1, wherein the intermediate section of the transition zone is straight, and the two outer sections of the transition zone are tangentially connected with one another via the intermediate section.

12. The vehicle wheel of claim 1, wherein the transition zone has two straight intermediate sections between the outer sections.

13. The vehicle wheel of claim 1, wherein the transition zone has two straight intermediate sections between the outer sections.

* * * * *